Aug. 16, 1966  W. E. MEISSNER  3,266,658
MOLDED CONTAINERS
Filed Oct. 29, 1963

United States Patent Office 3,266,658
Patented August 16, 1966

3,266,658
MOLDED CONTAINERS
William E. Meissner, Devon, Pa., assignor to FMC Corporation, Philadelphia, Pa., a corporation of Pennsylvania
Filed Oct. 29, 1963, Ser. No. 319,717
4 Claims. (Cl. 220—48)

This invention relates to improved molded containers.

A primary object of this invention is to provide for generally new or improved and more satisfactory molded plastic containers having attached container opening means.

Another object is to provide improved plastic, fluid-tight containers having independent container opening means integrally attached thereto.

A still further object is the provision of a molded plastic container having severing means for severing the container along a predetermined location and which facilitates replacement of the severed portion thereof as a removable container cover or lid.

Still further objects will appear from the following description.

The container of the present invention is formed by a method as more fully described in my application Serial No. 374,481, filed June 11, 1964, which involves suspending a gob or parison or closed tube of plastic film-forming material within a desirably shaped mold, expanding such film-forming material as a seamless envelope against the internal walls of the mold and into engagement with a preformed ring which is supported within such mold, and thereafter causing the expanded envelope of film-forming material to set. The preformed ring is formed with a series of spaced, inwardly or radially extending projections or teeth with which the film-forming material interlocks as it is expanded and set. The containers molded by this method may be filled with a flowable material and sealed while still remaining in the mold or alternatively, they may be released and stored or filled in a separate and independent operation.

In the containers formed the preformed rings are firmly mechanically interlocked with the container walls without actually projecting therethrough. In other words, as the plastic film-forming material is expanded during the molding operation it flows into and about the inwardly extending projections or teeth of the preformed ring without being ruptured or punctured. As a result, in the finished container the portion of the wall thereof to which the preformed ring is mechanically attached retains its continuous, unbroken and fluid-tight characteristics.

The preformed rings which are attached to the containers may be formed of metal, plastics or any other suitable materials which are capable of withstanding the conditions employed during the molding operation. The projections or teeth are preferably flat and pointed and are provided with cutting edges which are adapted to sever the seamless container when the ring is turned relative thereto, as more fully described hereafter.

The container of the present invention may be made from a wide variety of materials which may be rendered plastic or in a flowable condition. Preferred types include the synthetic linear polymers of thermoplastic character and the elastomeric types. Examples include vinyl resins, such as polyvinyl acetate, copolymers of vinyl chloride and vinyl acetate, copolymers of acrylonitrile and vinyl acetate, polyacrylonitrile and copolymers of acrylonitrile with vinyl chloride, vinyl acetate, methacrylonitrile, and so forth, polyethylene, linear superpolymers of the polyester of nylon (polyamide) type, polyvinyl butyral, polyvinyl alcohols, polyvinyl ethers; elastomeric types may include neoprene, polymers of chloroprene, copolymers of butadiene with styrene or acrylonitrile, polyisobutylene, and so forth. It is to be understood that the mentioning of these particular materials is not intended to limit the invention thereto but merely to illustrate the wide variety of film-forming materials that can be used in carrying out the invention. Of course, the selection of any particular material depends upon the character of the material which is to be packaged in the finished container. Thus, polyvinyl acetate, polyvinyl acetals and polyvinyl alcohols and neoprene, especially the latter two types, are highly advantageous when packaging oils, especially of the hydrocarbon type. Polyvinyl acetate, polyvinyl chloride, related copolymers of these two monomers, and polyethylene are, on the other hand, particularly adapted for packaging of aqueous liquids.

In the drawing, FIGURE 1 is a vertical section taken through a container of the present invention, with a portion thereof being broken away;

Figure 1:
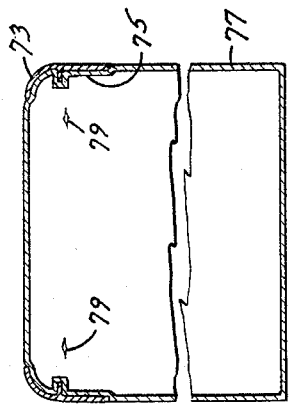

Referring to FIGURE 1 of the drawing, the container of the present invention is denoted by the character 77 and includes a preformed ring 73 which is interlocked with a completely closed, seamless, unitary container body portion 75. The preformed ring 73 preferably encircles a portion of the side wall of the container body and extends over at least a portion of an adjacent end wall thereof and is formed with a plurality of flat, inwardly directed, pointed projections 79 having cutting edges for use in severing the container 77 as hereafter described.

In making the containers shown in FIGURE 1 by the method as described in my above noted pending application, the preformed ring 73 is supported in a mold cavity in inverted position after which a gob of plastic or flowable film-forming material is then expanded within the mold cavity and against the walls thereof to form the seamless container 77. During this expansion, the still plastic film-forming material flows over and around the pointed projections 79 of the ring 73 without adhering thereto and without disturbing the unbroken continuity of the container 77.

Figure 2:
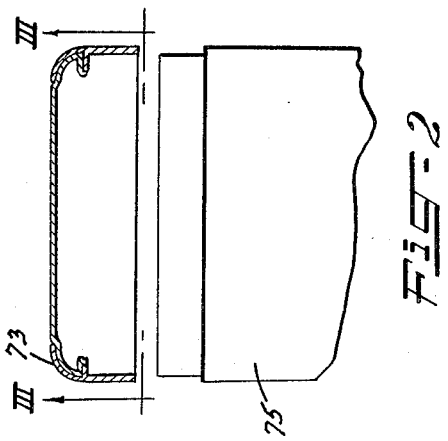
FIGURE 2 is a side view of the container of FIGURE 1 in an opened position.
Figure 3:
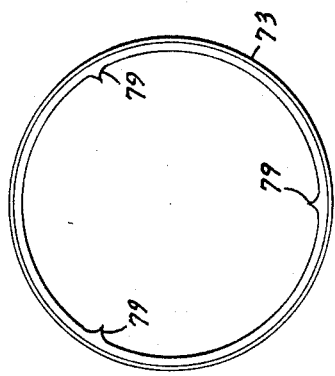
FIGURE 3 illustrates a portion of the container shown in FIGURE 2 as viewed along the line III—III.

The container 77 may be opened by merely rotating the preformed ring 73 relative to the remainder of the container whereby the cutting edges on the ring projections 79 sever the container 77 annularly. As shown in FIGURE 2, the upper portion of the now severed container and the ring 73 are maintained in interlocked relationship by the inwardly directed ring projections 79 and thus together serve as a replaceable cap or lid.

It is to be understood that changes and variations may be made without departing from the spirit and scope of the invention as defined in the appended claims.

I claim:
1. A molded container formed of organic plastic material having a completely closed, body of unbroken, seamless and unitary construction, and an independent ring attached to the outside of and extending about said container body, said ring having a series of spaced inwardly extending projections which interlock with correspondingly shaped recesses formed in the container body, said projections having cutting edges adapting the same to sever the seamless container body when the ring is turned relative thereto.

2. A molded container including a ring having a plurality of spaced, inwardly extending projections, and an annular, completely closed, unbroken, seamless and unitary hollow body formed of organic plastic material molded within and interlocked with said ring projections, said ring and body being adapted for movement relative to each other whereby said projections serve to sever the container body.

3. A container as defined in claim 2 wherein said ring encircles a portion of the side wall of said container body and extends over at least a portion of an adjacent end wall thereof.

4. A container as defined in claim 3 in which said projections are flat and pointed.

References Cited by the Examiner

UNITED STATES PATENTS

| | | | |
|---|---|---|---|
| 1,675,395 | 7/1928 | Whisler | 150—8 |
| 2,009,257 | 7/1935 | Goldberg | 220—48 |
| 2,342,372 | 2/1944 | Scherer. | |
| 2,752,971 | 7/1956 | Tupper | 150—.5 |
| 2,766,478 | 10/1956 | Raley | 264—4 |
| 2,828,789 | 4/1958 | Groendyk | 150—.5 |
| 2,837,245 | 6/1958 | Grebowiec | 215—1.5 X |
| 2,872,760 | 2/1959 | Meissner | 264—4 |

FOREIGN PATENTS 1,319,686   1/1963   France.

JOSEPH R. LECLAIR, *Primary Examiner.*

FRANK T. GARRETT, *Examiner.*